US009638160B2

(12) United States Patent
Spooner et al.

(10) Patent No.: US 9,638,160 B2
(45) Date of Patent: May 2, 2017

(54) METHOD AND SYSTEM FOR CONTROLLING HYDROELECTRIC TURBINES

(75) Inventors: Edward Spooner, Bishop Auckland (GB); Simon Cawthorne, Carlingford (IE); Wee Keong Khoo, Carlingford (IE)

(73) Assignee: Openhydro IP Limited (IE)

( * ) Notice: Subject to any disclaimer, the term of this patent is extended or adjusted under 35 U.S.C. 154(b) by 0 days.

(21) Appl. No.: 14/238,428

(22) PCT Filed: Aug. 10, 2012

(86) PCT No.: PCT/EP2012/065715
§ 371 (c)(1),
(2), (4) Date: May 9, 2014

(87) PCT Pub. No.: WO2013/024039
PCT Pub. Date: Feb. 21, 2013

(65) Prior Publication Data
US 2014/0246854 A1     Sep. 4, 2014

(30) Foreign Application Priority Data

Aug. 12, 2011  (GB) ...................................... 1113932
Dec. 13, 2011  (EP) ...................................... 11193220

(51) Int. Cl.
*F03B 15/00*     (2006.01)
*F03B 13/10*     (2006.01)
(Continued)

(52) U.S. Cl.
CPC .............. *F03B 13/10* (2013.01); *A47G 19/02* (2013.01); *F03B 15/00* (2013.01); *H02M 5/45* (2013.01); *Y02E 10/28* (2013.01); *Y02E 10/38* (2013.01)

(58) Field of Classification Search
CPC ............ F03B 13/10; F03B 15/00; H02M 5/45
See application file for complete search history.

(56) References Cited

U.S. PATENT DOCUMENTS 4,308,575 A * 12/1981 Mase .............................. 363/48
4,367,890 A    1/1983 Spirk
(Continued)

FOREIGN PATENT DOCUMENTS

EP    2 003 758 A1    12/2008
JP    S 57-3117 A      1/1982
(Continued)

OTHER PUBLICATIONS

International Search Report for corresponding PCT/EP2012/065715, completed Jun. 28, 2013.

*Primary Examiner* — Tulsidas C Patel
*Assistant Examiner* — Viet Nguyen
(74) *Attorney, Agent, or Firm* — Tarolli, Sundheim, Covell & Tummino LLP

(57) ABSTRACT

A hydroelectric turbine array system comprises an array of turbine systems and a supervisory controller. Each turbine system of the array comprises a hydroelectric turbine and a control system. The control system includes a converter system arranged to convert AC power, supplied by a generator connected to the hydroelectric turbine and having a voltage and frequency that is a function of a rotational speed of the hydroelectric turbine, to AC power having a voltage and frequency of a transmission system for transmitting the AC power to a receiving station and a control unit co-operable with the converter system to adjust the AC voltage supplied by the generator. The supervisory controller determines a performance level of a plurality of hydroelectric turbines within the array and instructs the control unit of at least one of the turbine systems to adjust the AC voltage supplied by the generator to alter the power generated by the (Continued)

at least one of the turbine systems to thereby control the overall power generated by the array.

10 Claims, 10 Drawing Sheets

(51) Int. Cl.
*A47G 19/02* (2006.01)
*H02M 5/45* (2006.01)

(56) References Cited

U.S. PATENT DOCUMENTS

| | | | |
|---|---|---|---|
| 4,536,698 A * | 8/1985 | Shevalenko et al. | 95/7 |
| 4,719,554 A | 1/1988 | Bertschi | |
| 5,499,178 A * | 3/1996 | Mohan | 363/39 |
| 5,798,631 A * | 8/1998 | Spee et al. | 322/25 |
| 6,437,996 B1 * | 8/2002 | Wobben | 363/37 |
| 6,566,764 B2 * | 5/2003 | Rebsdorf et al. | 290/44 |
| 2002/0181258 A1 * | 12/2002 | Welches | 363/89 |
| 2003/0007368 A1 | 1/2003 | Kawazoe et al. | |
| 2003/0137149 A1 * | 7/2003 | Northrup et al. | 290/44 |
| 2003/0218338 A1 | 11/2003 | O'Sullivan et al. | |
| 2003/0227172 A1 * | 12/2003 | Erdman et al. | 290/44 |
| 2005/0012339 A1 | 1/2005 | Mikhail et al. | |
| 2005/0042098 A1 * | 2/2005 | Wobben | F03D 7/0272 416/132 B |
| 2005/0122083 A1 * | 6/2005 | Erdman et al. | 322/20 |
| 2006/0273595 A1 * | 12/2006 | Avagliano | F03D 7/028 290/44 |
| 2007/0030708 A1 * | 2/2007 | Wei et al. | 363/44 |
| 2007/0121354 A1 * | 5/2007 | Jones et al. | 363/47 |
| 2007/0274115 A1 * | 11/2007 | Michaels et al. | 363/164 |
| 2008/0013351 A1 * | 1/2008 | Alexander | 363/123 |
| 2008/0284252 A1 * | 11/2008 | Jones et al. | 307/82 |
| 2009/0096211 A1 * | 4/2009 | Stiesdal | 290/44 |
| 2010/0085783 A1 * | 4/2010 | Jiang-Hafner | 363/35 |
| 2010/0109325 A1 * | 5/2010 | Hupe et al. | 290/31 |
| 2010/0250012 A1 * | 9/2010 | Arinaga et al. | 700/287 |
| 2010/0312409 A1 * | 12/2010 | Zeumer et al. | 700/287 |
| 2010/0327591 A1 * | 12/2010 | Dick et al. | 290/52 |
| 2011/0018266 A1 * | 1/2011 | Oswald et al. | 290/43 |
| 2011/0057444 A1 * | 3/2011 | Dai et al. | 290/44 |
| 2011/0141773 A1 * | 6/2011 | Larsen et al. | 363/35 |
| 2011/0156389 A1 * | 6/2011 | Arlaban Gabeiras et al. | 290/44 |
| 2011/0198847 A1 * | 8/2011 | Hopewell | 290/44 |
| 2011/0310642 A1 * | 12/2011 | Dai et al. | 363/37 |
| 2012/0008355 A1 * | 1/2012 | Kravitz | 363/126 |
| 2012/0126628 A1 * | 5/2012 | Bjerknes | 307/84 |
| 2012/0175962 A1 * | 7/2012 | Zhan et al. | 307/82 |
| 2012/0203384 A1 * | 8/2012 | Arlaban Gabeiras et al. | 700/286 |

FOREIGN PATENT DOCUMENTS

| | | |
|---|---|---|
| JP | S 60-84789 A | 5/1985 |
| JP | H 11-27993 A | 1/1999 |
| JP | 2000-123456 A | 4/2000 |
| JP | 2000-511391 A | 8/2000 |
| JP | 2002-155846 A | 5/2002 |
| JP | 2003-18897 A | 1/2003 |
| JP | 2003-501000 A | 1/2003 |
| JP | 2003-088190 A | 3/2003 |
| JP | 2003 319694 A | 11/2003 |
| JP | 2007-195315 A | 8/2007 |
| JP | 2008-228500 A | 9/2008 |
| JP | 2008-274882 A | 11/2008 |
| JP | 2008-312360 A | 12/2008 |
| JP | S 47-44265 B2 | 5/2011 |
| WO | WO 97/45912 A1 | 12/1997 |
| WO | WO 00/36298 A1 | 6/2000 |
| WO | WO 00/73652 A1 | 12/2000 |
| WO | WO 2004/027257 A2 | 4/2004 |
| WO | WO 2008/055515 A1 | 5/2008 |

* cited by examiner

METHOD AND SYSTEM FOR CONTROLLING HYDROELECTRIC TURBINES

RELATED APPLICATIONS

The present invention application is a U.S. National Phase Patent which claims priority from PCT Application Ser. No. PCT/EP2012/065715, filed 10 Aug. 2012, which claims priority from EP 11193220.8, filed 13 Dec. 2011 and GB1113932.6 filed 12 Aug. 2011, all of which are incorporated herein in their entirety.

FIELD OF THE INVENTION

This invention relates to a method and system for controlling turbines, and in particular, a method and system for providing control of hydroelectric turbines to optimise the performance of the turbines.

BACKGROUND OF THE INVENTION

Hydroelectric turbines are recognised as a means for effectively harnessing a clean and renewable energy source. Groups of hydroelectric turbines, installed in the sea, exploit natural currents caused by tides or by river flows near estuaries, to thereby generate electrical power for provision to utility grids, generally provided on shore.

Access to turbines installed in the sea is expensive and hazardous. Therefore, it is preferable, where possible, to avoid the use of components that present any risk of failure or wear. Thus, fixed pitch turbine blades are preferable to blades with adjustable pitch mechanisms, low-speed generators coupled directly to the turbine are preferable to high-speed generators coupled through gears and permanent-magnet excitation of the generators is preferred to arrangements that require brushes and slip rings or commutators.

In most cases, the groups of turbines comprise large numbers of turbines. Given the large number of turbines involved, it would be impractical and uneconomic to deliver the power to shore by a separate power cable connected to each turbine. Therefore, each power cable installed for transmitting power to shore is preferably arranged to collect the power from several turbines. In order for a significant amount of power to be transmitted from the group of turbines to a grid connection point on shore, which may be typically several kilometers from the turbines, the power cable operates at a high voltage. However, electrical elements within the turbine, such as generator windings, are normally designed to operate at much lower voltages for reliability and economy.

Furthermore, turbulence, and irregular topography of the seabed and nearby shorelines cause differences in the water flow velocity, and therefore, differences in the available power at each turbine within a group of turbines served by a single cable. In order to obtain the maximum power from the water current, a rotational speed of each turbine of the group of turbines should be adjusted in accordance with the prevailing water flow velocity. Thus, the turbines within a group are typically operated at different speeds and if fitted with permanent magnet generators, produce electrical outputs of differing frequency and voltage.

It is therefore an object of the present invention to provide a system for converting electrical power produced by a turbine to a form compatible with a power transmission system for transmitting the electrical power to shore, whilst ensuring the performance of the turbine and of the group of turbines as a whole, is optimised.

SUMMARY OF THE INVENTION

According to the present invention there is provided a control system for controlling an operation of a hydroelectric turbine, the control system comprising:

a converter system, arranged to convert AC power, supplied by a generator connected to the turbine, and having a voltage and frequency that is a function of a rotational speed of the turbine, to AC power having a voltage and frequency of a transmission system for transmitting the AC power to a receiving station; the system further comprising a control unit, the control unit being co-operable with the converter system to adjust the AC voltage supplied by the generator in response to a water flow speed through the turbine to thereby control rotation of the turbine.

Preferably, the AC power supplied by the generator has a voltage and frequency that is proportional to the rotational speed of the turbine.

Preferably, the converter system comprises a first-stage converter and a second-stage converter, with a DC link provided between the first and second-stage converters, the first-stage converter being arranged to convert the AC power supplied by the generator to DC power, and the second-stage converter being arranged to convert the DC power to the AC Power for transmission to the receiving station.

Alternatively, the converter system comprises a cycloconverter or a matrix converter, arranged to convert the AC supplied by the generator to the AC Power for transmission to the receiving station.

Preferably, the DC link includes at least one sensor for sensing a DC current and is arranged to provide signals associated with the sensed DC current to the control unit.

Preferably, the DC link includes at least one sensor for sensing a DC voltage and is arranged to provide signals associated with the sensed DC voltage to the control unit.

Preferably, the first-stage converter comprises a rectifier.

Preferably, the rectifier is a three-phase, phase-controlled rectifier, and the control unit is arranged to adjust a delay angle of a thyristor trigger signal of the phase-controlled rectifier.

Alternatively, the first-stage converter comprises a thyristor AC controller in series with a diode bridge.

Preferably, the second-stage converter is a phase-controlled, current-source, line-commutated inverter.

Preferably, responsive to the water flow speed being less than a rated value, the control unit is arranged to adjust a firing angle of thyristors of the second-stage converter to set the DC link voltage to a value for providing an optimum DC power value at the DC link.

Preferably, responsive to the water flow speed being less than a threshold value, the control unit is arranged to set the first-stage converter to behave as an uncontrolled rectifier, to determine the DC link current, to determine an optimum DC power value associated the water flow speed for the turbine, and to adjust the operation of the second-stage converter to set the DC link voltage to a value to provide the optimum DC power value for the determined DC link current.

Preferably, responsive to the water flow speed exceeding a rated value, the control unit is arranged to adjust a firing angle of thyristors of the second-stage converter to set the DC link voltage to a threshold DC voltage value, and to adjust a firing angle of thyristors of the first-stage converter for setting the DC link current to the fixed value for restricting the DC power to the optimum DC power value.

Preferably, responsive to the water flow speed exceeding a threshold value, the control unit is arranged to adjust the second-stage converter to set the DC link voltage to a threshold DC voltage value, to determine an optimum DC power value associated the water flow speed for the turbine, and to adjust the first-stage converter to set the DC link current to a fixed value to restrict the DC power to the optimum DC power value.

Alternatively, the first stage converter and the second-stage converter are of a voltage-source inverter type.

Preferably, the first-stage converter is a voltage-source inverter operated as an active front end and is arranged to operate with a fixed-voltage DC link.

Preferably, the first-stage converter and the second-stage converter are six-device, three-phase bridges, each device comprising a switch and free-wheel diode.

Preferably, the switches are selected from any of semiconductor switches, such as Insulated-Gate Bipolar Transistor, IGBT, switching devices, Integrated Gate Commutated Thyristors, (IGCT) or Gate Turn Off (GTO) thyristors.

Preferably, the switching devices are arranged to receive and operate in accordance with signals received from the control unit.

Preferably, a capacitor is connected in parallel with DC terminals of the first and second-stage converters and is arranged to maintain a substantially constant DC link voltage over a period of a switching cycle of the switches of the devices.

Preferably, the control unit is arranged to control the devices of the first-stage converter to thereby control a voltage provided at an AC input of the first-stage converter.

Preferably, the control unit is arranged to control the devices of the first-stage converter to set an amplitude and frequency of the voltage at the generator terminals and the corresponding real and reactive power flows.

Preferably, the first-stage converter is controlled to provide to the generator, an AC voltage that changes according to the electrical frequency in such a way that the resulting AC current is in phase with an electro-magnetic force induced in the windings of the generator.

Preferably, the control unit is arranged to control the AC output voltage of the second stage converter by controlling an amplitude and frequency of the AC output voltage by means of switching signal transmitted to the devices of the second stage converter.

Preferably, the control unit is arranged to modify an operation of the devices of the first-stage controller to adjust the frequency of the AC voltage at the input terminals of the first-stage converter to control the rotation of the turbine.

Preferably, responsive to the water flow speed being less than a threshold value, the control unit is arranged to determine the DC link current, to determine an optimum DC power value associated the water flow speed for the turbine, and to adjust the operation of the first stage converter by modifying a switching sequence of the devices to adjust the frequency of the AC voltage at the input terminals to a value to provide the optimum DC power value for the determined DC link current.

Preferably, responsive to the water flow speed exceeding a threshold value, the control unit is arranged to determine an optimum DC power value associated the water flow speed for the turbine, and to adjust the operation of the first stage converter by modifying a switching sequence of the devices to adjust the frequency of the AC voltage at the input terminals to a value to provide a fixed value to restrict the DC power to the optimum DC power value.

Preferably, the threshold value is a normal operating flow speed or rated speed.

Preferably, the control system is arranged to cooperate with a supervisory controller to determine the threshold value for the turbine.

Preferably, the threshold value is based on any of a performance level of each turbine within an array of turbine systems, a pattern of water flow across an array of turbines, and grid operator preferences.

Preferably, each turbine system is connected to a common cable to shore.

Preferably, the performance level of the turbine includes an output power of each turbine of the turbine systems within the array of turbines.

Preferably, there is further provided a turbine system, the turbine system comprising the converter system and further comprising a hydroelectric turbine connected to a generator, the generator being arranged to provide an AC power output as an input to the control system.

Preferably, the turbine has fixed blades and the generator incorporates a directly coupled permanent-magnet generator.

Preferably, the turbine system further comprises a transmission system, including a transformer, the transmission system being arranged to receive AC power output from the control system and transmit the AC power to a receiving station provided on shore.

Preferably, the turbine system further comprises a first power factor correction component provided between an output of the generator and an input of the converter system, to compensate for effects of the converter system on the generator's power factor.

Preferably, the first power correction component comprises three component sets, each comprising an inductor in series with a capacitor and each component set being provided in parallel with respective three phase outputs of the generator. The capacitors serve to reduce both the time harmonic components of the generator current and the reactive part of the fundamental component so that the generator losses are reduced and each of the inductors serve to prevent large current flowing through the corresponding capacitors when the three-phase, phase-controlled rectifier commutates.

Preferably, the turbine system further comprises a second power factor correction component provided between an output of the converter system and the transmission system to ensure the transmission system operates at a relatively high power factor. In this way, losses within the cable to shore are minimised and the transmission system operates at maximum capacity for delivering real power to the grid.

Preferably, the second power factor correction component comprises three component sets, each comprising at least a capacitor, and optionally, an inductor in series with the capacitor, and each component set being provided in parallel with respective three phase outputs of the converter system. The capacitors serve to reduce the current carried by the transmission system in order to minimise losses and to maximise the capacity of the transmission system to transmit useful real power to shore and the inductors are provided to prevent large currents being drawn from the capacitors when the thyristors of the second-stage converter are switched.

The capacitors may be connected to the high voltage terminals of the transformer, or to the low voltage terminals.

Alternatively, the second power factor correction component may be connected to a separate winding of the transformer so that a leakage inductance of the winding prevents the capacitors from disrupting the operation of the converter system.

Preferably, the turbine system, is provided with a first power cable arranged to connect the turbine system to at least one other turbine system in parallel, and is arranged to feed a common second power cable which carries the AC power to shore.

Alternatively, the second power factor correction components may be connected to a junction between the first and second power cables.

The present invention further provides an array of turbine systems comprising a plurality of turbine systems connected together in parallel by a first power cable, the turbine systems being arranged to feed a common second power cable, which is arranged to carry the AC power to the receiving station.

Preferably the array of turbine systems further comprises a supervisory controller arranged to determine a performance level of each turbine within the array and to instruct the control unit of each turbine system to adjust the AC voltage supplied by the generator to alter the power generated by each turbine system to thereby control the overall power generated by the array.

In this way, the output power of the array of turbine system can be monitored and individual turbine systems selected, such as those having turbines subjected to higher than average water flows, and their operation modified to compensate for other turbine systems within the array which are not producing the rated power because the associated water flow is lower than average.

Preferably, the first and second power cables are arranged to carry three-phase AC current at a line-to-line voltage suitable for electrical equipment that does not require oil insulation, such as a line-to-line voltage of 22 kV.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
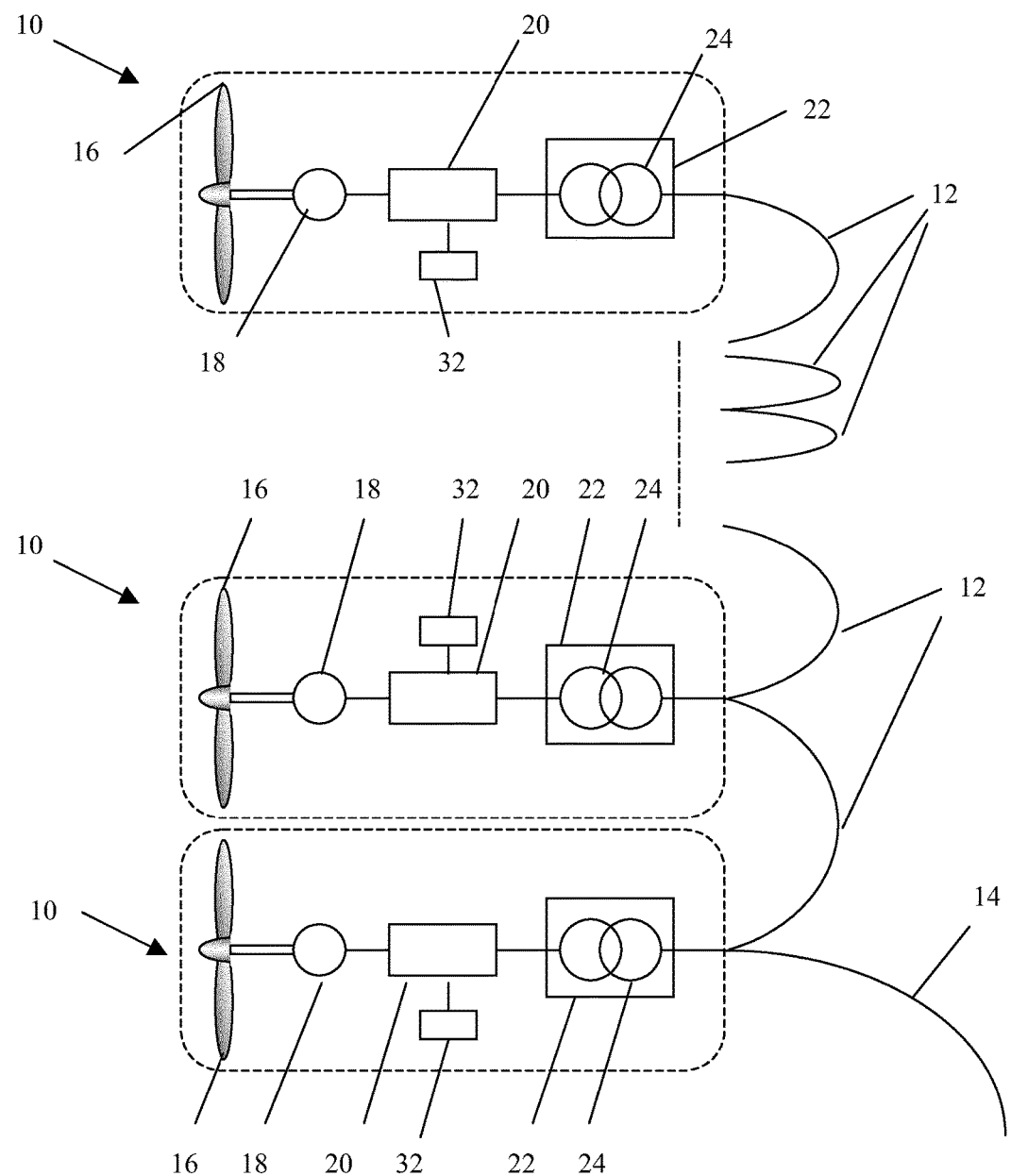
FIG. 1 is an electrical arrangement of a group of turbines systems, according to a preferred embodiment of the present invention.

Referring to FIG. 1, there is illustrated a preferred electrical arrangement of a group of turbine systems 10, and preferably, hydroelectric turbines.

The turbine systems 10 are electrically connected together in parallel by a short power cable 12, and feed one or more main transmission power cable(s) 14 arranged to transmit power collected from the group of turbine systems 10 to a receiving station (not shown) provided near to or on shore. In the preferred embodiment, the power cables carry three-phase AC current at a line-to-line voltage of 22 kV, to thereby minimise any power loss in the cable. However, it will be appreciated that any suitable cables may be employed.

As illustrated, each turbine system 10 comprises a turbine 16, for example, a tidal-current turbine. In the preferred embodiment, the turbine preferably includes fixed blades.

The turbine 16 is connected to a generator 18, arranged to convert mechanical energy generated by the turbine 16 to electrical energy. In the preferred embodiment, the generator 18 is a directly coupled permanent-magnet generator and provides a three-phase AC power output, having a voltage and frequency that is proportional to a rotational speed of the turbine 16. In an alternative embodiment, the generator 18 is an induction generator providing a three-phase AC power output, having a voltage and frequency that is a function of a rotational speed of the turbine 16. However, it will be appreciated that arrangements with any suitable numbers of phases may be employed. In some designs of generators, it is possible to separate coils of the windings into groups to provide two or more outputs that are electrically isolated.

The output (or each electrical output, as the case may be) of the generator 18 is provided to AC terminals of a power converter system 20 to convert the three-phase AC power to AC power in a form compatible with a transmission system 22 for transmitting power collected from the group of turbine systems 10 to the receiving station on shore.

The transmission system 22 includes a transformer 24 to increase the voltage of the power delivered by the converter system, typically 400 or 690V to the voltage of the transmission system.

A transformer (not shown) provided at the receiving station (not shown) is arranged to convert the power received via the power cable 14 to a voltage suitable for connection to a grid or alternatively, to a voltage suitable for connection to a subsequent stage of power conversion that may be needed prior to grid connection.

The voltage of 22 kV is chosen because it is within the range of maintenance-free cast-resin transformers. Such transformers would be suitable for use within gas-filled enclosures located close to the turbines 16. Higher voltages may require an oil-filled transformer, which imposes a periodic maintenance requirement and presents a potential environmental hazard.

Tidal currents are generally turbulent causing the water flow speeds to typically vary between 60% and 140% of an average value, over time periods ranging from a few seconds to several minutes. The power available from the water flow is proportional to the cube of the flow speed and for a typical case of a turbine having a nominal rated power value of 1 MW, when the average flow speed is 3 m/s, the available power from each turbine may vary between 0.216 MW and 2.744 MW.

Figure 2:
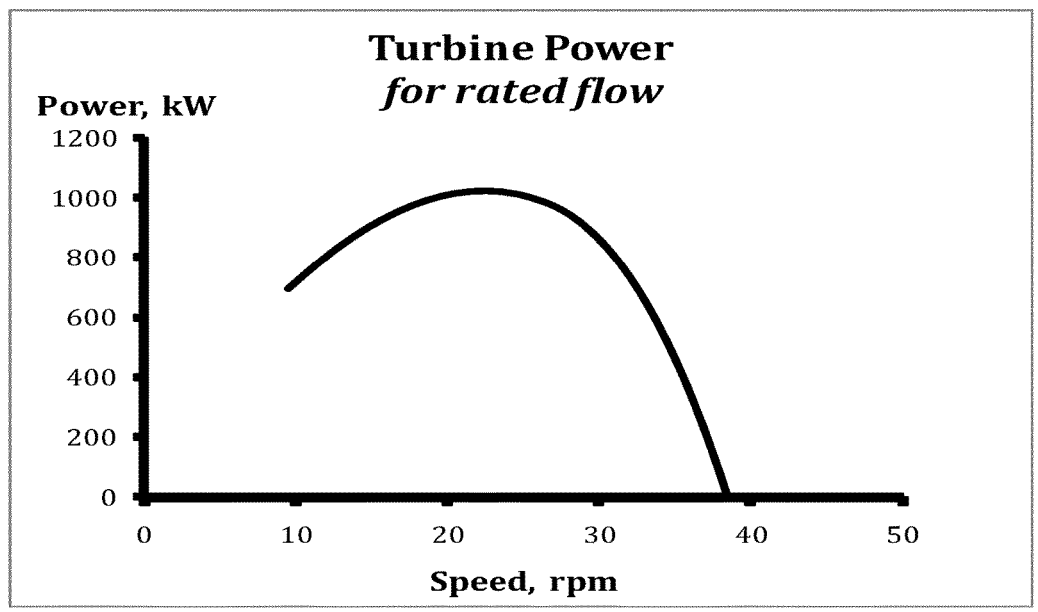
FIG. 2 is a graphical representation of turbine characteristics as power versus rotational speed.

As depicted in the graph of FIG. 2, a relationship exists between electrical power produced by a turbine and a speed of rotation of the turbine, for a rated water flow speed. As illustrated, the power generated for the considered turbine increases as the speed of the rotation increases up to a maximum power value of approximately 1000 kW for a rotational speed of between 20 and 25 rpm. Thereafter, the power generated decreases as the speed of the rotation increases, depicting a zero power value for rotational speed of between 35 and 40 rpm. Thus, it can be inferred that for a rated water flow value, the power generated by a turbine increases as the rotational speed of the blades of the turbine increases. However, beyond a given threshold value of speed of rotation, the generated power begins to decrease.

A ratio between mechanical power developed by the turbine 16 and power carried by the water flow is called the power coefficient (CP) of the turbine 16. The power carried by the water flow is related to an area of the turbine 16 intercepting the water flow and the speed of the water flow. The power coefficient is a dimensionless parameter that is a function of a tip speed ratio, which is a second dimensionless parameter equal to a ratio between peripheral speed of the turbine 16 and the speed of the water flow. The power coefficient reaches a maximum value for an optimum value of the tip speed ratio. For the situation depicted in FIG. 2, the tip speed ratio is equal to its optimum value when the rotational speed is 22 rpm and the maximum power coefficient multiplied by the power of the flow yields a mechanical power of 1 MW.

At times when the water flow speed is less than a normal operating flow speed, or rated speed, it is desirable that the torque or rotational speed of the turbine 16 is adjusted so that it is being operated to extract as much power from the water flow as possible. Similarly, at times when the water flow speed exceeds the rated speed, it is desirable to limit the power generated to a rated value to protect the turbines 16 from excessive mechanical stress and avoid overloading and overheating of other components within the turbine system 10.

The power converter system 20 of the present invention is therefore arranged to control the operation of the turbines, and in particular, the rotational speed of the turbines, to ensure optimal power is generated at times when the water flow speed is less than a rated value, and limit the power generated at times when the water flow speed is greater than a rated value.

Accordingly, the power converter system 20 of the turbine system 10 is preferably arranged to communicate with a control unit 32. The control unit 32 is arranged to determine an indication of the water flow speed through the turbine 16. In the preferred embodiment, the present water flow speed is inferred from the measured current from the generator together with the operating frequency and voltage. However, it will be appreciated that the present water flow speed may be a measured value obtained by a flow sensor or it may be probabilistically derived using statistics and/or forecast information, for example, or alternatively, by adjusting a measured value of the water flow speed in accordance with information derived from statistics and/or forecasts.

Figure 3:
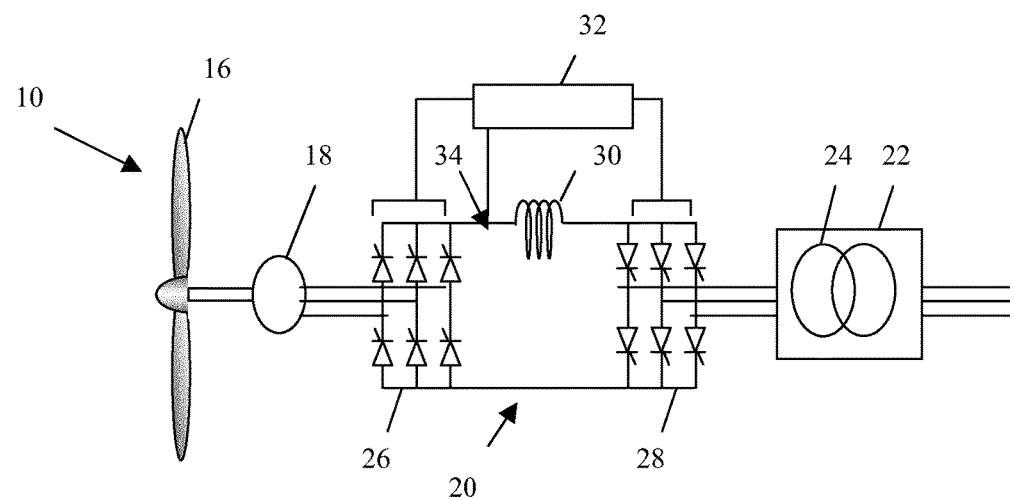
FIG. 3 depicts one of the turbine systems of FIG. 1, including a power converter system according to a first embodiment of the present invention.

Referring now to FIG. 3, there is illustrated the turbine system 10, including a detailed depiction of the power converter system 20 according to a first embodiment of the present invention. In this first embodiment, the power converter system 20 comprises a first-stage converter 26 and a second-stage converter 28.

The first-stage converter 26 is a rectifier arranged to convert input AC power received from the generator, and having a frequency corresponding to a rotational speed of the generator, to DC power. As illustrated, the rectifier is preferably a three-phase, phase-controlled rectifier, such as a thyristor bridge. Alternatively, it will be appreciated that the first-stage converter 26 may be realised as a thyristor AC controller, followed by a diode bridge, as discussed in more detail below with respect to FIG. 4.

The second-stage converter 28 is an inverter arranged to convert the DC power provided by the first-stage converter 26 to AC power, having a voltage and frequency of the transmission system 22. In this embodiment, the inverter is a thyristor bridge operating as a phase-controlled, current-source, line-commutated inverter.

For every value of the water flow speed, there is an optimum rotational speed of the turbine 16 that yields maximum output power from the turbine 16 and there is a corresponding optimum relationship between the voltage and current of a DC link 34, provided between first-stage converter 26 and the second-stage converter 28.

Thus, the control unit 32 is arranged to adjust the DC link voltage in response to the present water flow speed, in order to control the rotation of the turbine 16.

When the water flow speed through the turbine 16 is less than the rated speed value, the control unit 32 is arranged to cause the first-stage converter 26 to operate or behave as an uncontrolled rectifier (i.e., one in which the firing angles are set to 0 degrees), such that the speed of the generator 18 and the speed of the turbine 16 are directly related to the voltage of the DC link 34. Thus, by adjusting the DC link voltage to a set value, the DC current is subsequently altered, and therefore the AC power, enabling the control of the rotational speed of the turbine 16, and in this case, preferably, causing a reduction in the rotation of the turbine, and thereby ensuring the optimum power is being extracted from the turbine.

The first-stage converter 26, and in the preferred embodiment, the controlled rectifier, is used during periods of high water flow speed to allow the rotational speed of the turbines 16 to rise so that the generated power is restricted to a desired maximum value.

When the water flow speed through the turbine 16 exceeds the rated speed value, the control unit 32 is arranged to set the second-stage converter 28, and in particular, the firing or phase angle of the thyristors of the second-stage converter 28, to provide a maximum value for the DC link voltage. The control unit 32 is further arranged to set the DC link current to a fixed value by adjusting the first-stage converter 26, to thereby restrict the power being yielded from the generator 18 to the desired maximum value. Thus, the voltage at the input of the first-stage converter 26 is increased, and accordingly, the rotational speed of the turbine 16 is increased.

As illustrated in FIG. 3, an inductor 30 is preferably provided in series between the output of the first-stage converter and an input of the second-stage converter to handle varying demands on the system, and to ensure that the DC current remains continuous despite the switching of the thyristors.

Due to the resulting high voltage produced by the generator 18, the first-stage converter utilises switching devices such as thyristors of very high rated voltage.

Figure 4:
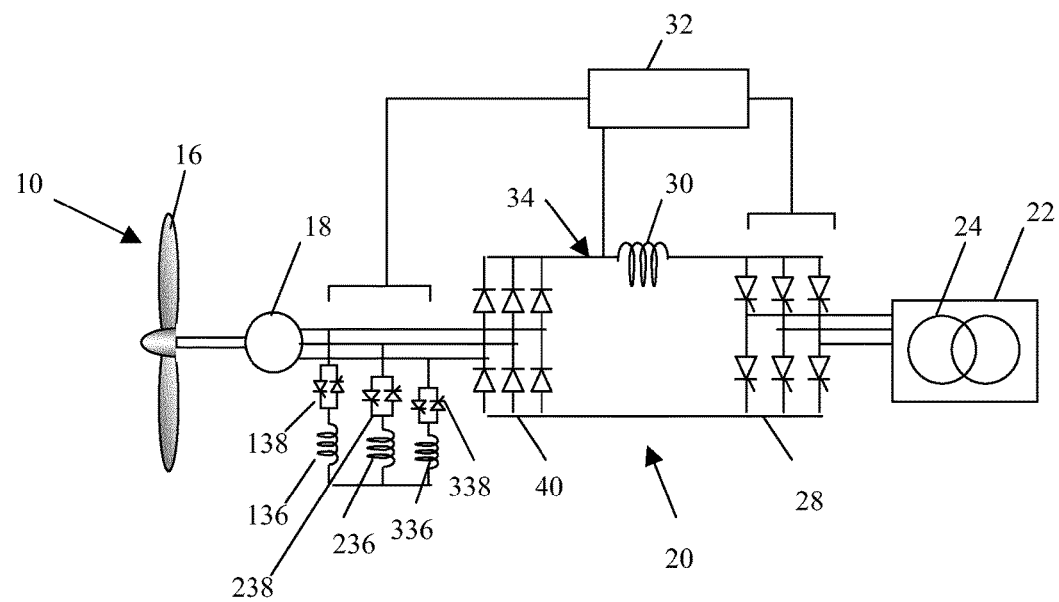
FIG. 4 depicts one of the turbine systems of FIG. 1, including a power converter system according to a second embodiment of the present invention.

In a second embodiment, as illustrated in FIG. 4, instead of using very high voltage thyristors, the voltage of each of the three phase AC outputs from the generator 18 may be reduced by connecting each output to an inductive load 136, 236 and 336, provided in parallel with respective inputs of the rectifier of the first-stage converter 26. A reactive current drawn by the inductive load 136, 236 and 336 is arranged to cause a large voltage drop in the winding inductance of the generator 18. The inductive loads 136, 236 and 336 are preferably connected to the rectifier of the first-stage converter by respective solid-state switches 138, 238 and 338 and the rectifier is preferably a plain diode rectifier 40. In this embodiment, the control unit 32 is arranged to adjust the firing angle of the thyristors of the solid-state switch under phase control in order to control the first-stage converter, and therefore the rotation of the turbines 16.

Figure 5:
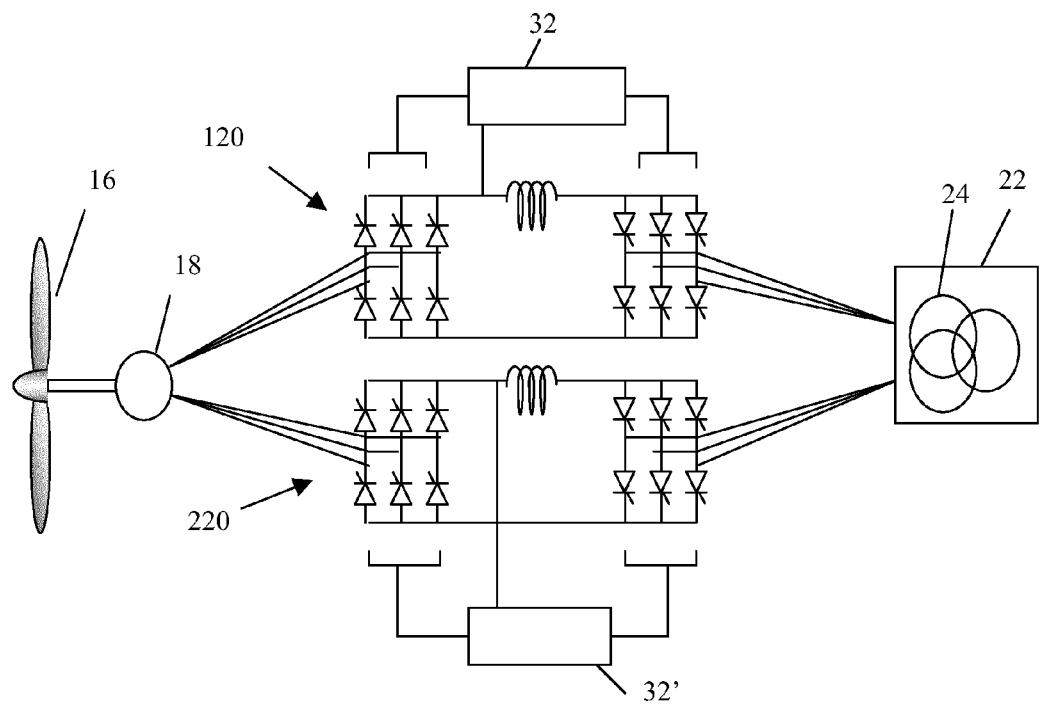
FIG. 5 depicts one of the turbine systems of FIG. 1, including a power converter system according to a third embodiment of the present invention.

In a third embodiment depicted in FIG. 5, two three-phase AC power outputs are provided by the generator 18 and are arranged to feed into separate first and second power converter systems 120 and 220, respectively. The outputs of the first and second power converter systems 120 and 220 are arranged to feed separate windings of a common transformer creating a twelve-pulse system which produces significantly lower harmonic current in the transmission system 22, than would be produced by a lower value pulse system. It will be further appreciated that the turbine system 10 of the present invention may employ any number of suitable three-phase groups.

It will be further appreciated that in the event of a fault occurring in one of the two or more power converter systems 120, 220, the other power converter system(s) could continue to function and allow the turbine 10 to operate with restricted maximum power. In such a case, the control units 32, 32' are preferably provided with a detecting means (not shown) for detecting the fault and applying a suitably reduced maximum power limit. It will be that the control units 32, 32' are connected or otherwise arranged such that they are capable of communicating with one another. Alternatively, a single control unit 32 may be employed and connected to each of the power converter systems 120, 220.

Figure 6:
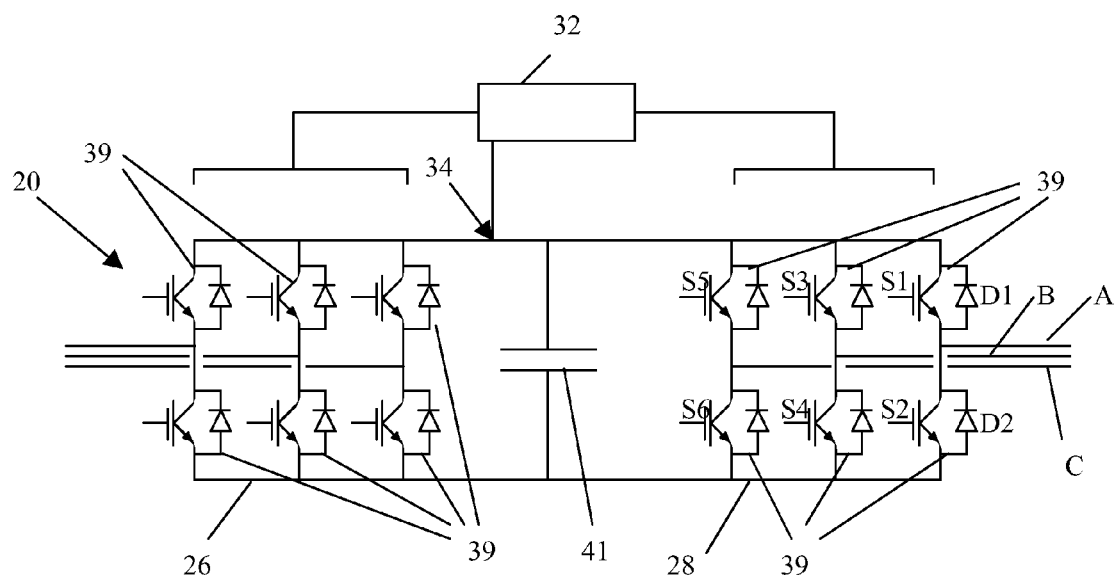
FIG. 6 depicts one of the turbine systems of FIG. 1, including a power converter system according to a fourth embodiment of the present invention.

In a fourth embodiment of the present invention, the power converter system 20 of FIG. 3 is replaced with the power converter system 20 of FIG. 6. As illustrated, the power converter system of FIG. 6 also comprises a first-stage converter 26 and a second-stage converter 28. The first-stage converter 26 is arranged to convert AC power supplied by the generator 18 to DC power, and the second-stage converter 28 is arranged to convert the DC power to AC power for transmission to the receiving station (not shown).

As with the converter systems of the previous embodiments, the converter system 20 of FIG. 6 is arranged to communicate with a control unit 32 to receive control signals and to provide the control unit 32 with a measure of power passing through the power converter system 20. To this end, a sensor (not shown) is provided at the DC link 34 to detect and monitor the DC current passing between the first and second-stage converters and to transmit a signal to the control unit 32.

In this embodiment, the first-stage converter 26 and the second-stage converter 28 are of a voltage-source inverter type. In particular, the first-stage converter is preferably a voltage-source inverter operated as an active front end and is arranged to operate with a fixed-voltage DC link.

As illustrated in FIG. 6, the first-stage converter 26 and the second-stage converter 28 are six-device, three-phase bridges, each device 39 comprising a semiconductor switch and free-wheel diode.

In this embodiment, the first-stage converter 26 and the second-stage converter 28 are based on Insulated-Gate Bipolar Transistor, (IGBT) switching devices 39. However, it will be appreciated that other types of switching such as Integrated Gate Commutated Thyristors, (IGCT) or Gate Turn Off (GTO) thyristors may be employed. The switching devices 39 are controlled and operate in accordance with signal received from the control unit 32.

As illustrated in FIG. 6, a capacitor 41 is preferably connected in parallel with DC terminals of the first and second-stage converters 26 and 28. The capacitor 41 is arranged to maintain a substantially constant DC link voltage over a period of a switching cycle of the switching devices 39. The control unit 32 is arranged to adjust a phase of output voltage of the second-stage converter 28 in response to changes in the voltage at the capacitor 41, thereby maintaining the DC link voltage within close limits of a specified value.

In this embodiment of the invention, the second-stage converter 28 is arranged to convert the DC power provided by the first-stage converter to AC power for transmission to the receiving station (not shown). A voltage provided at an AC output terminal comprising output AC lines, A, B and C, of the second-stage converter 28 is preferably achieved using pulse width modulation, (PWM).

In order to control the voltage provided at line A, a switch S1 of the second-stage converter 28 is repeatedly switched on and off. When switch S1 is on, current flows from a positive DC line to line A. When switch S1 is off, the current continues to flow in the same direction through the line A because of inductance in components within the transmission system such as the transformer and is forced to pass through a free-wheel diode D2 provided in parallel with a second switch S2. When current is flowing in the other direction, it passes through switch S2 and free-wheel diode D1 provided in parallel with the first switch S1.

When switch S1 is on, the voltage at line A is substantially equal to a voltage of the positive DC line and when switch S1 is off, the voltage at line A is substantially equal to a voltage of a negative DC line. A time average voltage at line A is therefore related to the voltage at the positive and negative DC lines and a ratio of a duration of switch Si being on to the duration of off periods. Thus, an average voltage at line A can be controlled by controlling switching signals sent to switches S1 and S2.

In particular, by varying the switching ratio of on to off periods at the switches S1 and S2 of the devices 39, the average voltage at the line A can be controlled to take any value between the voltages at the two DC lines. Thus, in this embodiment, the control unit 32 provides a high frequency switching signal with the ratio varying cyclically to create an approximately sinusoidal voltage with superimposed high frequency component at line A of the AC output terminal.

Preferably, a small filter (not shown) is employed to attenuate the high frequency component.

The voltage at lines B and C is controlled in the same manner by controlling the devices 39 associated with lines B and C.

For example, the DC link 34 may operate at 1100V and the switching signal fed to the gates of the IGBTs of the second-stage converter 28 may have a frequency of typically 3000 Hz. The ratio of on to off periods may be varied between 1:10 and 10:1 so that an average voltage at the AC output terminal varies between 100 and 1000V. If the ratio varies sinusoidally in time with a frequency of 50 Hz, then the output voltage at line A of the AC output terminal has an average value of 550V with a superimposed 50 Hz AC component with amplitude 450V and rms value 318V.

A similar signal fed to the switches S3 and S4, connected to line B causes the voltage at line B to vary in the same way but it may be phase shifted so that the 50 Hz component is 120 degrees out of phase with that on line A. An AC voltage between lines A and B is therefore 551V rms and if the signal fed to the switches S5 and S6 for line C is further phase shifted by 120 degrees then the three lines A, B and C, carry a balanced three-phase output voltage of 551 Vrms Line to Line. By suitably changing the switching signals, the control unit 32 can control the AC output voltage in amplitude and frequency.

The amplitude of the output AC voltage of the second-stage converter 28 determines an amount of reactive power that flows into the three-phase AC network and the phase of the output voltage with respect to the network voltage determines the real power flow.

Similarly, the control unit 32 is arranged to control the devices 39 of the first-stage converter 26 to thereby control a voltage provided at an AC input of the first-stage converter 26, and therefore an AC voltage at the terminals of the generator 18. In particular, the first-stage converter 26 is controlled to set the amplitude and frequency of the voltage at the generator terminals and the corresponding real and reactive power flows.

Furthermore, the first-stage converter 26 is controlled to provide to the generator 18, an AC voltage that changes according to the electrical frequency in such a way that the resulting AC current is in phase with an electro-magnetic force (emf) induced in the windings of the generator 18.

For a given water flow speed, the turbine 16 is associated with a substantially ideal rotational speed, a resulting frequency and emf and a corresponding power. Therefore, for the substantially ideal rotational speed, a component of the generator AC current, in phase with the emf, is a known function of frequency. A maximum efficiency of the generator is obtained when loss and therefore current, is minimised, which, in turn, means that the component of current in phase quadrature with the emf is preferably zero. The corresponding AC voltage at the generator terminals can be evaluated as a function of frequency and can be fixed as a demand parameter for the control unit 32.

As previously discussed, for every value of the water flow speed, there is an optimum rotational speed of the turbine 16 that yields maximum output power from the turbine 16 and there is a corresponding optimum relationship between frequency, voltage and power. The AC power is directly proportional to the DC link current since the DC link voltage is fixed. The control unit 32 is therefore arranged to set the frequency of the first stage converter according to the DC link current as measured by the sensor (not shown), in order to control the AC voltage at the generator.

In particular, the control unit 32 is arranged to modify an operation of the devices 39 of the first-stage controller 26 to adjust the frequency of the AC voltage at the input terminals of the first-stage converter in response to the present value of the DC link current.

When the water flow speed through the turbine 16 is less than the rated speed value, the control unit 32 is arranged to cause the first-stage converter 26 to adjust a frequency of the AC voltage at the input terminals of the first-stage converter, and therefore the AC terminals of the generator 18, so that the rotational speed of the generator and the turbine is optimised to extract the maximum power from the flow.

The first-stage converter 26 is used during periods of high water flow speed to allow the rotational speed of the turbines 16 to rise so that the generated power is restricted to a desired maximum value. When the water flow speed through the turbine 16 exceeds the rated speed value, the control unit 32 is arranged to cause the first-stage converter 26 to adjust a frequency of the AC voltage at the input terminals of the first-stage converter, and therefore the AC terminals of the generator 18, so that the rotational speed of the generator 18 and the turbine 16 results in the power being limited to a maximum value. If the flow is very high, the corresponding ideal voltage will exceed the voltage rating of the first stage converter 26 and the generator 18 will be required to carry a certain amount of AC current in phase quadrature with the emf and the loss in the generator 18 will be correspondingly higher than the minimum.

It will be appreciated that similar to the embodiment depicted in FIG. 5, the turbine system 10 of FIG. 6 may be modified to comprise two or more power conversion systems 20, each having parallel power conversion channels with separate DC links. This provides redundancy so that in the event of a failure of one of the channels, the turbine 16 may continue operating with restricted maximum power. The separate channels each take input from isolated sections of the generator winding so that a fault in one channel does not affect the operation of the others.

As previously discussed, a power cable 14 installed for transmitting power to shore is preferably arranged to collect the power from several turbine systems 10 in an array of turbine systems. The power cable to shore 14 and other infrastructure used to deliver power to the grid onshore represent a very large investment and it is preferable to utilise it to the maximum possible at all times. Therefore, when some of the turbines 16 in the array are operating at less than P/N where P is the maximum capacity of the cable and N is the number of turbines, it is useful to allow the other turbines to deliver more than P/N to thereby balance the overall amount of power being delivered. At other times it may be desirable or necessary to reduce the power generated, for example if the utility grid is lightly loaded and the grid operator requests a power contribution from the array of turbines that is lower than the power available from the prevailing flow.

Figure 7:
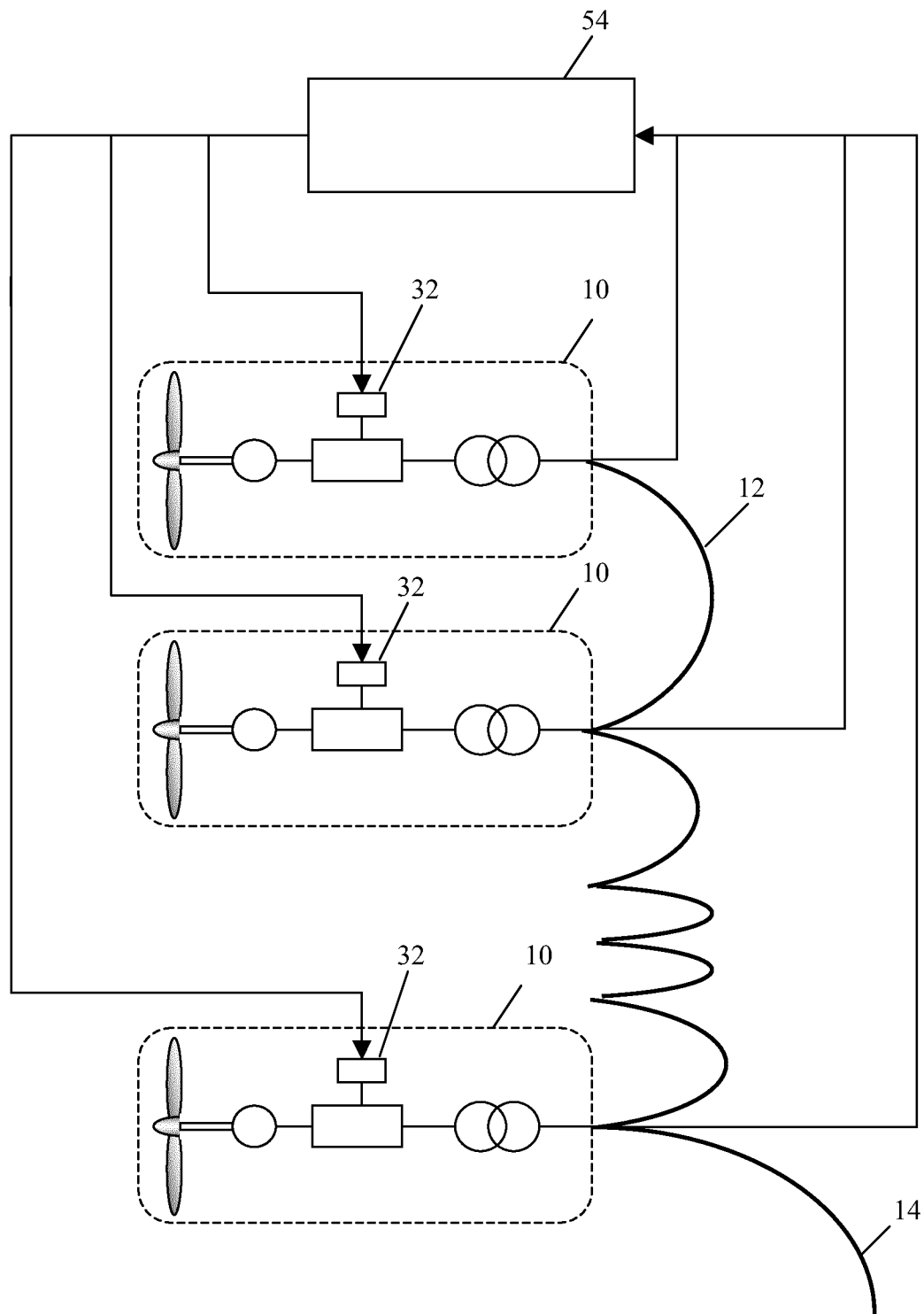
FIG. 7 depicts a supervisory controller arranged to communicate and cooperate with a control unit of any of the turbine systems of FIG. 3 to FIG. 6.

The present invention therefore further provides a means for adjusting and controlling the maximum power limit of individual turbines 16 according to the prevailing flow velocities at the other turbines, and the power being extracted by the other turbine systems 10 in the array. To this end, in the preferred embodiment, the control unit 32 is arranged to communicate and cooperate with a supervisory controller 54, as illustrated in FIG. 7, that acts to optimise the operation of an array or group of turbines 16 as a whole. The supervisory controller 54 is preferably arranged to monitor performance levels, including the output power of each turbine 16 within the array or group of turbines and is arranged to compensate for turbines 16 which are not producing the rated power because the associated water flow is lower than average, by instructing the control units 32 of turbine systems 10 whose turbines 16 are being subjected to higher flows to yield higher than rated power.

In the case that a total power generated by the array of turbines as a whole exceeds a threshold such as a threshold limit imposed by a grid operator, the supervisory controller 54 is arranged to direct the control unit 32 of some or all of the turbine systems 10 in the array to reduce the fixed value of the DC link current to thereby restrict the total output power yielded. Similarly, in the case that other turbines 16 in the array of turbine systems 10 are being subjected to a lower than average water flow, and are therefore are not producing the rated power, the supervisory controller 54 is arranged to direct or instruct the control unit 32 of selected turbine systems within the array to increase the fixed value of the DC link current to yield higher than rated power outputs and to thereby compensate for the lower power output being yielded by the other turbines 16 in the array.

Higher than rated power can be extracted by the turbine systems 10 at higher water flows in proportion to the square of the water flow by employing power factor correction components between the generator 18 and the power conversion system 20, as is explained in more detail below.

Power converter systems using phase-controlled rectifiers cause generators to operate at a power factor significantly less than unity. Thus, the generators are required to have a generator rating larger than otherwise necessary, which involves an increased quantity of magnetic material, and therefore increased cost.

Figure 8:
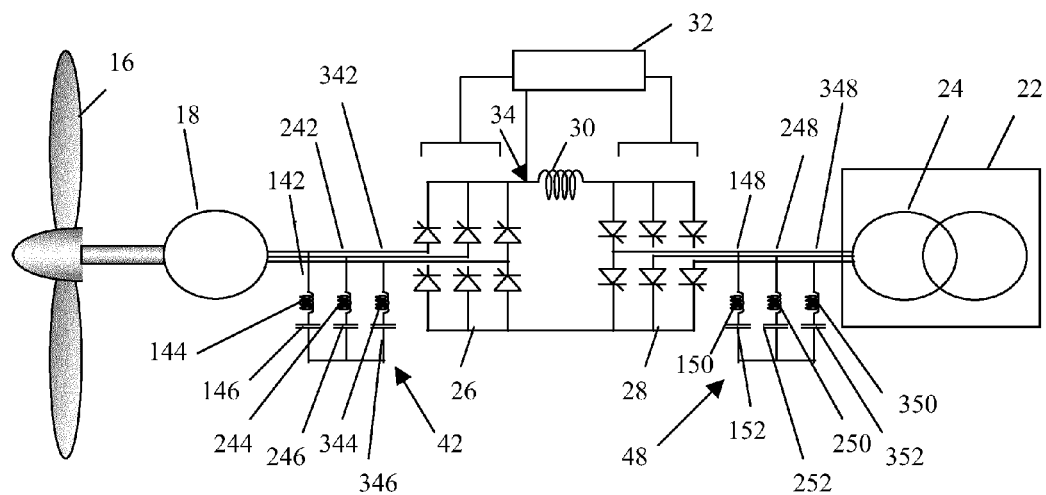
FIG. 8 depicts the turbine system of FIG. 3, further including a first and second power factor correction component.

Thus, in a preferred embodiment of the present invention, in order to compensate for the effect of the power converter system 20 on the generator's power factor, a first power factor correction component 42 is provided between the output of the generator 18 and the input of the first-stage converter of the power converter system of the turbine system of FIG. 3, as illustrated in FIG. 8.

In a preferred embodiment, the first power factor correction component 42 comprises three component sets 142, 242 and 342, respectively, each comprising an inductor 144, 244, 344, in series with a capacitor 146, 246, 346, and each component set 142, 242 and 342, being in parallel with respective three phase outputs of the generator 18. Each of the capacitor 146, 246, 346, reduces both the time harmonic components of the generator current and the reactive part of the fundamental component so that the generator losses are reduced. Each of the inductors 144, 244, 344, serves to prevent large current flowing through the corresponding capacitors 146, 246, 346, when the three-phase, phase-controlled rectifier 26 commutates.

In order to minimise losses and to maximise the capacity of the transmission system 22 to transmit useful real power to shore, a second power factor correction component 48 is provided between the output of the second-stage converter of the power converter system 20 and the transmission system of the turbine system of FIG. 3, as illustrated in FIG. 8.

In the preferred embodiment, the second power factor correction component 48 comprises three component sets 148, 248 and 348, respectively, each comprising an inductor 150, 250, 350 in series with a capacitor 152, 252, 352, and each component set 144, 244 and 344, being in parallel with respective three phase outputs of the second-stage converter 28. Each of the capacitors 152, 252, 352 reduce the current carried by the transmission system 22 in order to minimise losses and to maximise the capacity of the transmission system 22 to transmit useful real power to shore. The inductors 150, 250, 350 are provided to prevent large currents being drawn from the capacitors 152, 252, 352, when the thyristors of the second-stage converter 28 are switched.

Figure 9:
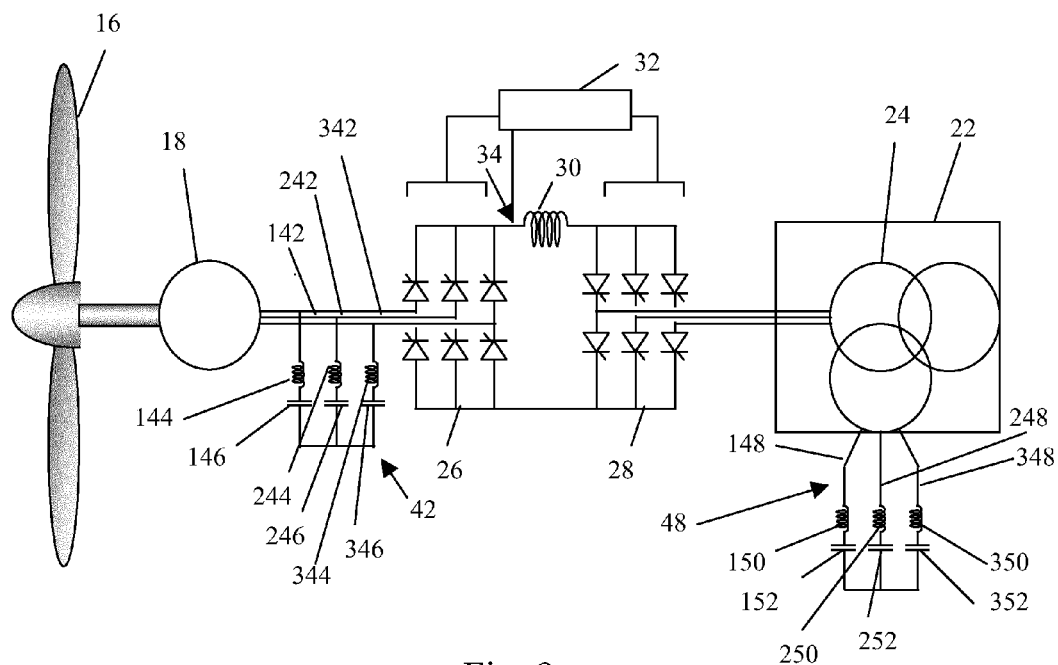
FIG. 9 depicts an alternative arrangement of the second power factor correction component of FIG. 8.

However, it will be appreciated that instead, the second power factor correction component 48 may be connected to a separate winding of the transformer 24, as illustrated in FIG. 9. In this case the leakage reactance of the transformer is normally sufficient to limit the current in the capacitor during commutation of the second-stage converter and the series inductors may be unnecessary.

Although the example of the power converter system 20 of FIG. 3 was employed in order to described the application of power correction components it will be appreciated that any of the power conversion embodiments disclosed could be modified to include power factor correction components described in order to compensate for the effect of the power converter system 20 on the generator's power factor and to minimise losses and to maximise the capacity of the transmission system 22 to transmit useful real power to shore.

Figure 10:
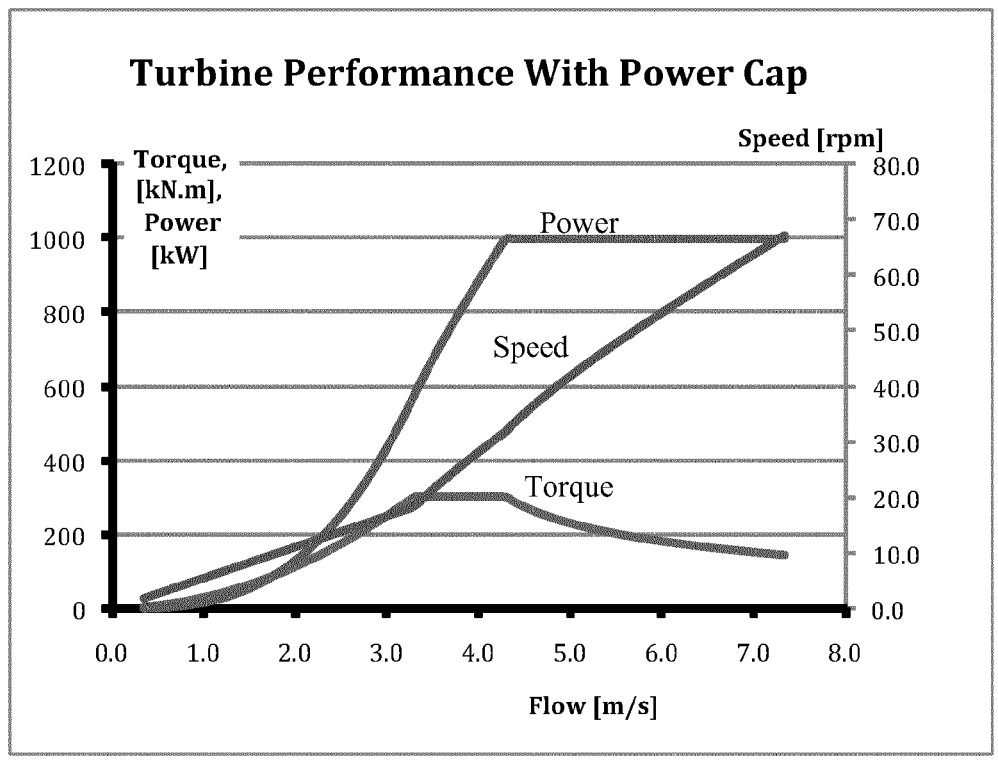
FIG. 10 shows a relationship between characteristics including speed, torque and power, of a turbine connected to a control system of the present invention and water flow speed.
Figure 13:
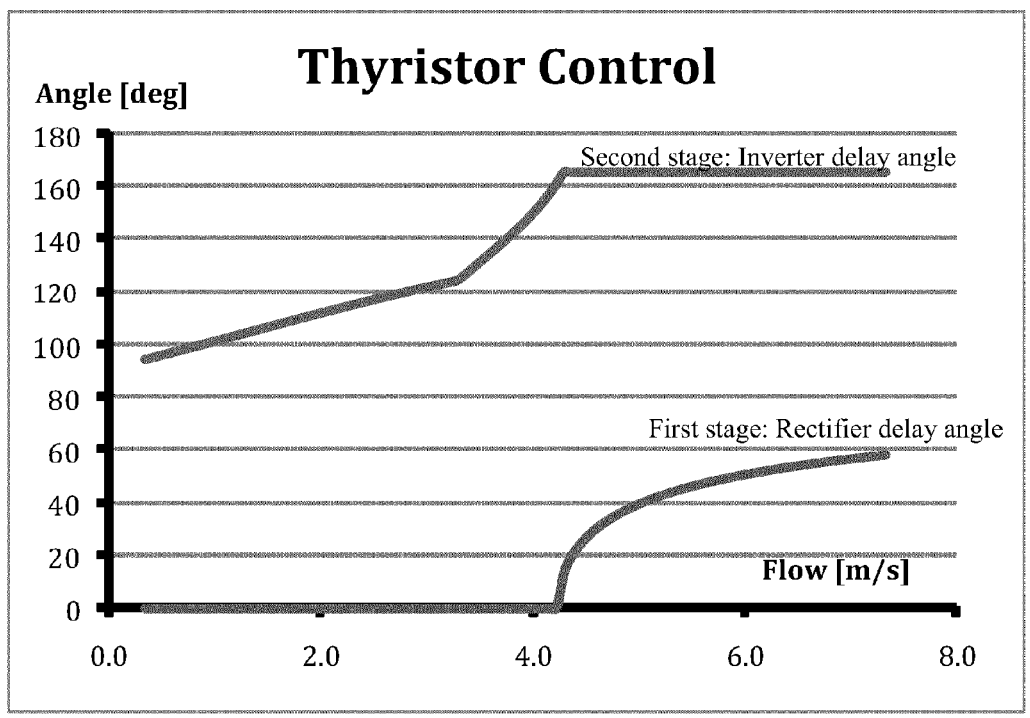
FIG. 13 depicts an operation of the thyristors of the rectifier of the first-stage converter and the inverters of the second-stage converter, under the control of the control unit, according to a preferred embodiment of the present invention.

FIG. 10 shows a relationship between characteristics including speed, torque and power, of a turbine connected to a control system of the present invention, which employs a power cap or limitation on the power produced for water flow speed beyond a threshold value, and water flow speed. As depicted, as the water flow speed increases towards the rated water flow speed, the speed, torque and power of the turbine increase. However, once the water flow speed exceeds the rated value, the power is capped, and the torque levels off, and tends to decrease as the water flow speed continues to increase. The speed of the turbines is increased to prevent excessive mechanical stress being placed on the turbine. Clearly, the control unit may be used to limit the torque at the onset of the power limit. This offers a reduction in the mechanical loads on the machine. In particular, FIG. 10 shows that for the particular example depicted, over a small range of flow between about 3.5 and 4.2 m/s the torque has been further restricted to a maximum value of about 300 kN.m. In the case that the power converter system employed is a voltage controlled inverter system such as the embodiment of FIG. 6, this is achieved by restricting the power using frequency control. Alternatively, in the case that the power converter system employed is a current controlled inverter system such as the embodiment of FIG. 3, such as a phase-controlled thyristor bridge, then the torque may be restricted by means of adjusting the trigger delay angle as illustrated in FIG. 13 and discussed in more detail below.

Figure 11:
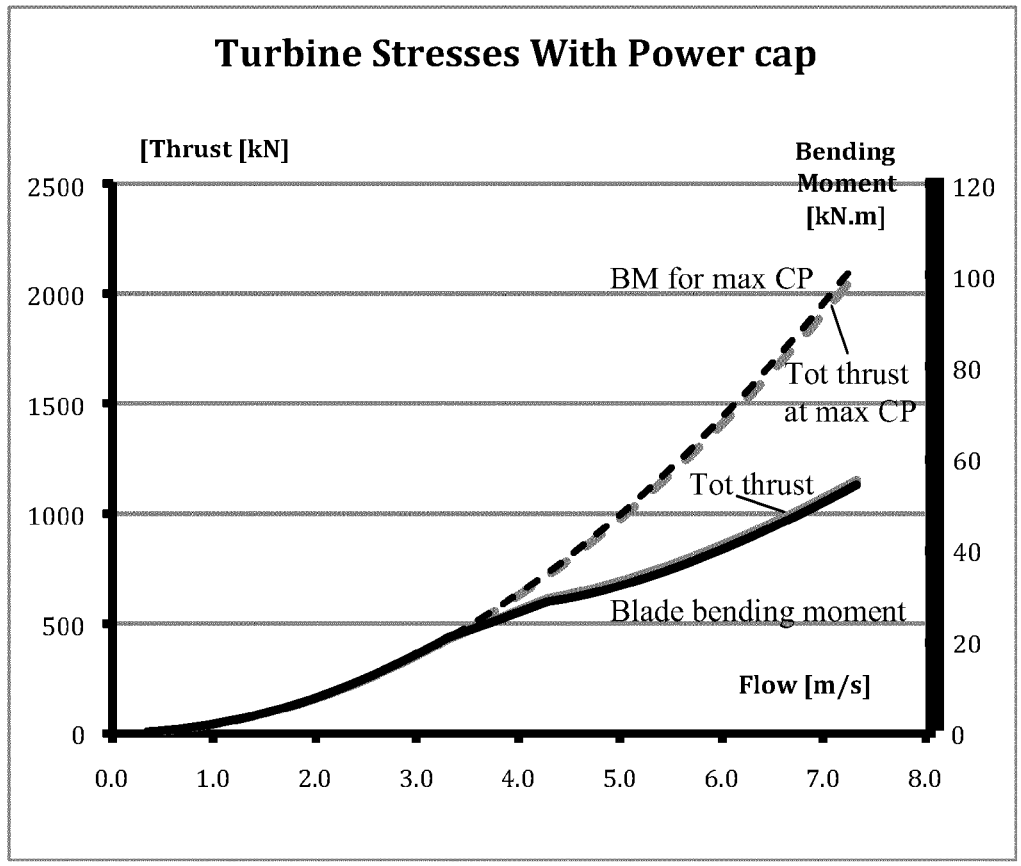
FIG. 11 shows a comparison of a variation in the turbine axial thrust and the bending moment on turbine blades as the rate of water flow increases, for a known turbine system, and a turbine system of the present invention.

FIG. 11 shows the variation in the turbine axial thrust and the bending moment on the turbine blades, as the rate of water flow increases. It can be seen that values for the blade bending moment and total thrust of the blades of the turbine are controlled to a reduced value by virtue of the control system of the present invention. However, the values for the blade bending moment and total thrust of the blades of the turbine, when the turbine has a maximum power coefficient (CP), and is not being controlled by the control system of the present invention, are shown to steadily increase as the rate of water flow increases. Preferably, the maximum torque value is a predetermined value and is selected to ensure that the temperature of the generator windings does not exceed a safe value. Furthermore, the maximum torque value is preferably chosen also to limit the stresses within the turbine 16 to an acceptable level because the torque and the stresses are related. FIG. 11 shows the relationship between two of the critical mechanical loads, the bending moment in the blades and the total axial thrust on the turbine. It can be seen that limiting the power when the speed of the flow is high leads to corresponding reductions in the mechanical loads and consequent reduction in stress. FIG. 11 corresponds to the case where the power has been restricted to a fixed value but it would be equally possible to further restrict the power and so limit the corresponding mechanical loads and stresses.

Figure 12:
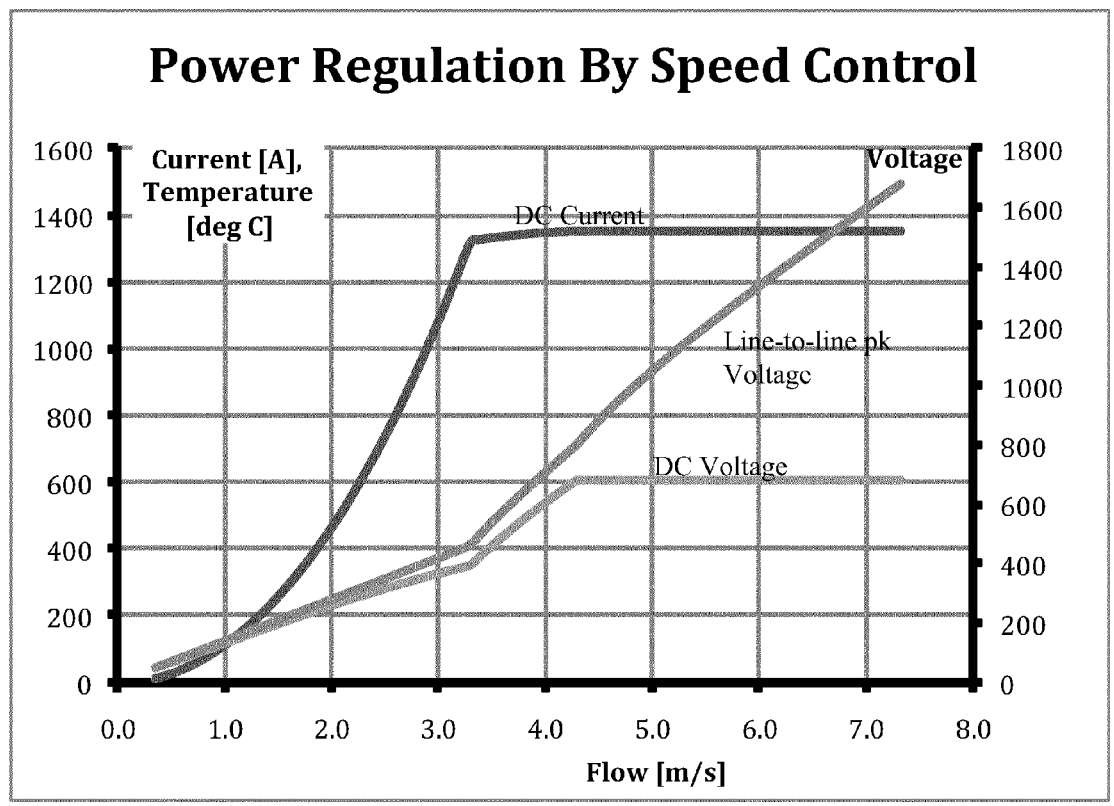
FIG. 12 depicts the regulation of the DC power in response to the water flow speed, in accordance with a preferred embodiment.

FIG. 12 depicts the regulation of the DC power in response to the water flow speed as described above, and FIG. 13 depicts the operation of the thyristors of the rectifier of the first-stage converter 26 and the inverters of the second-stage converter 28, under the control of the control unit 32. As illustrated in FIG. 13, for the turbine being considered, the rated water flow speed is approximately 4.1 m/s, and therefore, for a water flow speed increasing up to the rated water speed value, the graph depicts the firing angle of the thyristors of the second-stage converter being activated at increasingly greater angles. Once the water flow speed exceeds the rated water flow value, the thyristors of the first-stage converter are fired at increasingly greater angles in accordance with the increasing water flow speed, but the thyristors of the second-stage converter are held at a constant firing angle to ensure the maximum DC link voltage is provided.

The invention is not limited to the embodiment(s) described herein but can be amended or modified without departing from the scope of the present invention.

The invention claimed is:

1. A hydroelectric turbine array system comprising:
an array of turbine systems, each turbine system comprising:
a hydroelectric turbine; and
a control system, the control system having:
a converter system, arranged to convert AC power, supplied by a generator connected to the hydroelectric turbine, and having a voltage and frequency that is a function of a rotational speed of the hydroelectric turbine, to AC power having a voltage and frequency of a transmission system for transmitting the AC power to a receiving station; and
a control unit, the control unit being co-operable with the converter system to control operation of the respective hydroelectric turbine by adjusting an AC voltage supplied by the respective generator, wherein said control unit is configured to:
for a rated flow speed of water through said respective hydroelectric turbine, adjust said AC voltage to control the rotational speed of the respective hydroelectric turbine to extract a rated optimal power level from the respective hydroelectric turbine for said rated flow speed;
for a reduced flow speed of water less than said rated flow speed, adjust said AC voltage to control the rotational speed of the respective hydroelectric turbine to extract a reduced rated optimal power level from the respective hydroelectric turbine for said reduced flow speed; and
for an increased flow speed of water greater than said rated flow speed, to limit an output power of the respective hydroelectric turbine to a restricted power level; and a supervisory controller, the supervisory controller being arranged to monitor the output power of a plurality of said hydroelectric turbines within the array and to instruct, in response to determining that the output power of at least one of the hydroelectric turbines is below said rated optimal power level as a result of a reduction in said flow speed through the respective hydroelectric turbine, the control unit of at least one other of the turbine systems with a flow speed through said respective hydroelectric turbine above said rated flow speed to adjust the AC voltage supplied by the respective generator to increase the output power generated by the hydroelectric turbine of at least one other of the turbine systems above said rated optimal power level by increasing said restricted power level to thereby maintain the overall power generated by the array.

2. The hydroelectric turbine array system of claim 1, wherein the hydroelectric turbine has fixed blades and the generator incorporates a directly coupled permanent-magnet generator.

3. The hydroelectric turbine array system of claim 1, further comprising a transmission system, including a transformer, the transmission system being arranged to receive AC power output from the control system and transmit the AC power to a receiving station provided on shore.

4. The hydroelectric turbine array system of claim 1, wherein each turbine system of the array of turbine systems is connected to another turbine system of the array in parallel by a first power cable, the turbine systems being arranged to feed a common second power cable, which is arranged to carry the AC power to the receiving station.

5. The hydroelectric turbine array system of claim 4, wherein the first power cable and the second power cable are arranged to carry three-phase AC current at a line-to-line voltage suitable for electrical equipment that does not require oil insulation.

6. The hydroelectric turbine array system of claim 1, wherein the converter system comprises one of a cycloconverter and a matrix converter arranged to convert the AC supplied by the generator to the AC power for transmission to the receiving station.

7. The hydroelectric turbine array system of claim 1, wherein the converter system further comprises a first-stage converter and a second-stage converter, with a DC link provided between the first and second-stage converters, the first-stage converter being arranged to convert the AC power supplied by the generator to DC power, and the second-stage converter being arranged to convert the DC power to the AC power for transmission to the receiving station.

8. The hydroelectric turbine array system of claim 7, wherein the second-stage converter is of a voltage-source inverter type.

9. The hydroelectric turbine array system of claim 7, wherein the second-stage converter is of a current-source inverter type.

10. The hydroelectric turbine array system of claim 1, wherein the AC power supplied by the generator has a voltage and frequency that is proportional to the rotational speed of the turbine.

* * * * *